United States Patent [19]

de la Cruz Toran

[11] Patent Number: 4,518,054
[45] Date of Patent: May 21, 1985

[54] AIR CUSHION VEHICLE PROVIDED WITH A LIFT SYSTEM WITH AUTOMATIC TRANSVERSAL AIR DISTRIBUTION

[76] Inventor: D. Mariano de la Cruz Toran, La Rinconada B-6, Madrid 23, Spain

[21] Appl. No.: 471,526

[22] Filed: Mar. 2, 1983

[30] Foreign Application Priority Data

Mar. 18, 1982 [ES] Spain ................................. 510603

[51] Int. Cl.³ .............................................. B60V 1/12
[52] U.S. Cl. .................................... 180/118; 180/127
[58] Field of Search ............... 180/117, 118, 120, 121, 180/127

[56] References Cited

U.S. PATENT DOCUMENTS

| | | | |
|---|---|---|---|
| 3,362,499 | 1/1968 | Tripp | 180/121 |
| 3,365,018 | 1/1968 | Bliss | 180/121 |
| 3,384,198 | 5/1968 | Jones et al. | 180/121 |
| 3,443,659 | 5/1969 | Moore et al. | 180/118 |

*Primary Examiner*—John A. Pekar
*Attorney, Agent, or Firm*—Staas & Halsey

[57] ABSTRACT

An air cushion vehicle is provided with a lift system including a flexible keel. The vehicle has a rigid body which is supported on an air cushion. The air cushion is divided into two longitudinal semichambers by a flexible keel and is further defined by flexible skirts provided at the periphery of the rigid body. The flexible keel directs lift air to the semichambers and controls the attitude of the vehicle by automatically distributing lift air to one of the two longitudinal semichambers to provide a stabilizing force. The flexible keel is constructed of a plurality of flexible segments, each of which has two triangular portions which are joined by a trapezoidal portion having a curved bottom. When the flexible sheets are formed into a working configuration the two triangular portions are joined at a fastening point so that the top edge each of the flexible segment form a triangle. The triangular top edge is attached to the rigid body of the vehicle and the flexible keel is formed by disposing alternate flexible segments so that they face in opposite directions. The flexible keel distributes lift air to the semichambers in accordance with a pressure differential and is capable either of limiting the flow of lift air to one of the semichambers or of providing lift air to only one of the semichambers.

12 Claims, 30 Drawing Figures

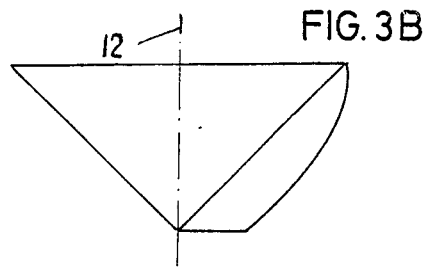
FIG. 3B
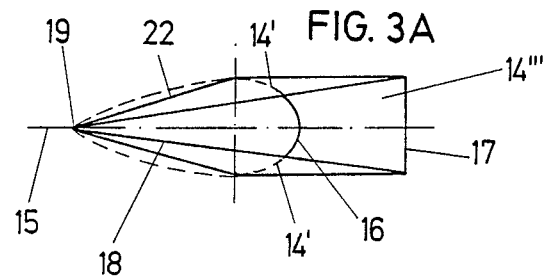
FIG. 3A
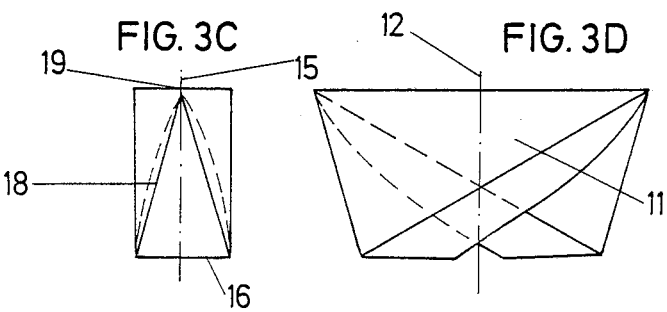
FIG. 3C
FIG. 3D
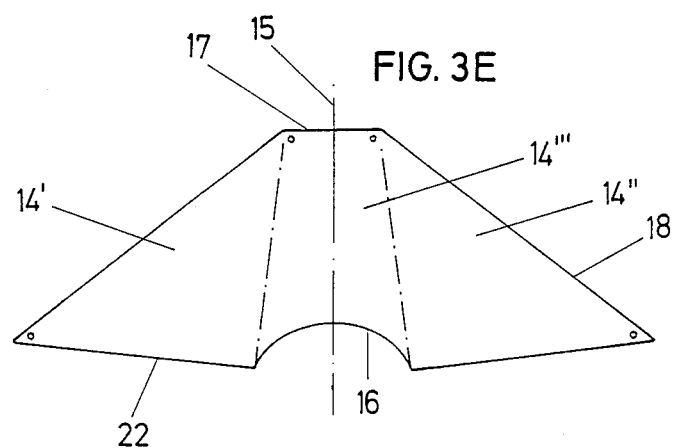
FIG. 3E

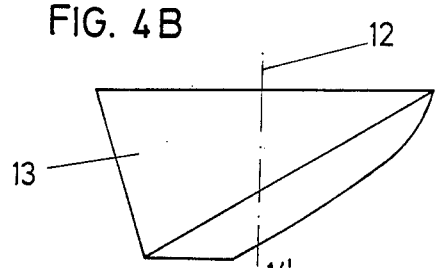
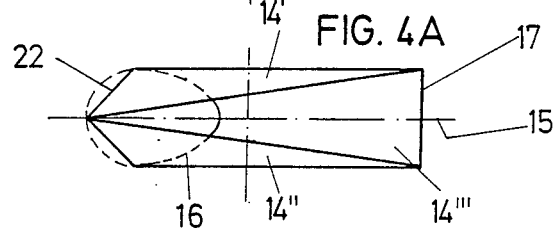
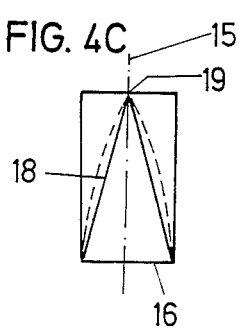
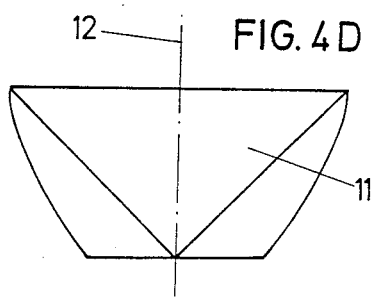
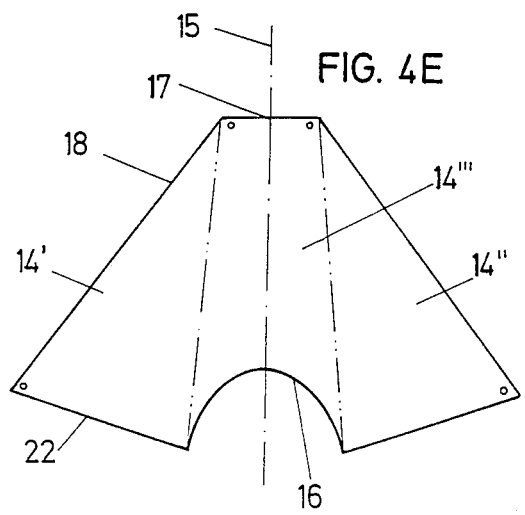

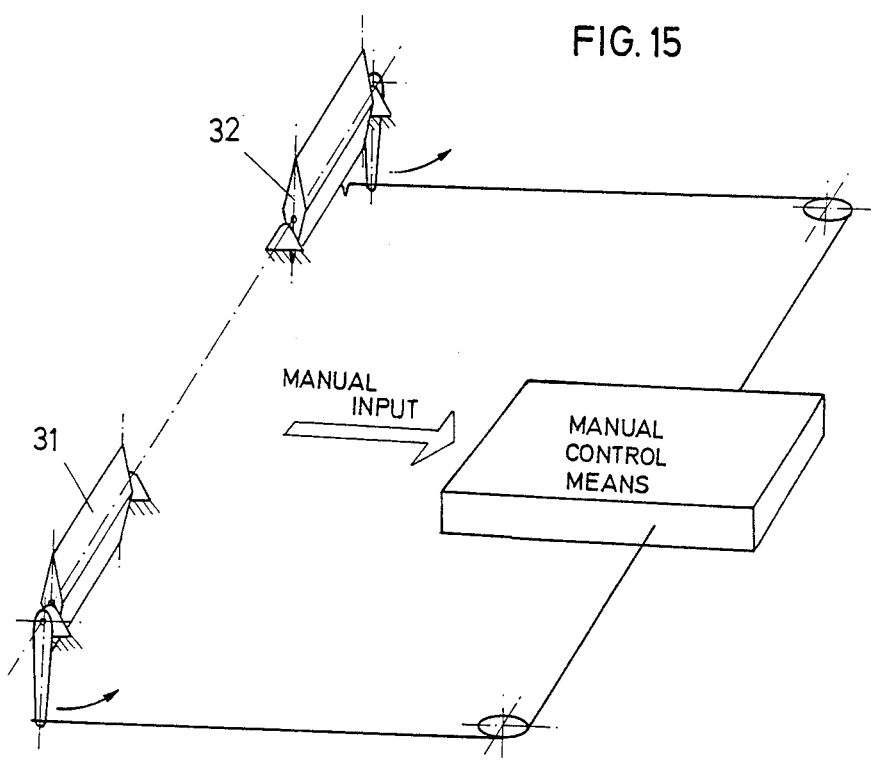

AIR CUSHION VEHICLE PROVIDED WITH A LIFT SYSTEM WITH AUTOMATIC TRANSVERSAL AIR DISTRIBUTION

BACKGROUND AND SUMMARY OF THE INVENTION

The present invention relates to an air cushion vehicle such as a Hovercraft vehicle, amphibious or not, equipped with an improved lift system which enables the supporting air to be transversely distributed automatically.

In order to define exactly the scope of application of the basic and essential characteristics included in its claims, it is necessary to define unmistakably what in this branch of engineering is understood by an air cushion vehicle or HOVERCRAFT vehicle and by its lift system.

A vehicle with these characteristics is that whose weight is totally or partially supported by the pressure of the air in an area limited vertically by elements of the same vehicle and the surface on which the former skims and horizontally by the vehicle's own means. Likewise, the lift system of the vehicle should be understood as the whole of the equipment or elements which enable it to be supported by the compressed air under it in a stable manner; also, apart from this primary function, the lift system can provide the vehicle with a series of desirable features, such as for example, low drag, minimum lift power, good platform stability, great directional stability, etc.

The aim of this invention is to develop an air cushion vehicle provided with a lift system which offers both roll and heave stability, easily adjustable between a very high value and another practically nil, which requires minimum supporting power, and which is also easy to execute.

In essence, the working of the lift system of a vehicle according to the present invention is based on the existence of a flexible keel, arranged below the hull of the vehicle, which divides the vehicle's air cushion into two longitudinal sections. When the vehicle heels the air outlet for the longitudinal section on the side of the vehicle approaching the surface closes and the flexible keel automatically directs the air from a distribution duct or internal channel, towards the longitudinal section or semichamber of the air cushion whose air outlet is closed. The air outlet for the longitudinal section on the side of the vehicle which is raised from the surface is fully opened and no air is directed from the internal channel towards the longitudinal section whose air oulet is open. The directing of the air by the flexible keel is performed with minimum loss of pressure due to the large air passage area which the flexible keel opens towards one of the longitudinal sections.

The roll stability of the vehicle is achieved by the difference in pressure between the two sections of the supporting chamber. Therefore, no contribution from the geometric configuration of the air cushion vehicle is necessary to obtain a sufficiently high stability value. The absence of a contribution by the geometric configuration to the stability of the air cushion vehicle makes it possible to achieve stability by using a valve which regulates the flow of supporting air between the two longitudinal sections.

The longitudinal stability of the vehicle is achieved by conventional methods, such as the geometrical arrangement of some of its elements, e.g., a certain angle of the bow skirt, or by a difference in air pressure between two air chambers one near each end of the vehicle with the pressure varying according to the longitudinal trim, or by a combination of both methods.

The characteristic features and originality of the vehicle provided with this supporting system, compared with others whose stability is also achieved by a difference in pressure, are due to the manner in which the flexible keel functions. The flexible keel makes it possible to distribute the air without any appreciable loss of pressure. Thus, the maximum pressure of the system can be practically equal to the minimum pressure, which is always the supporting pressure existing in the semichamber or air cushion. In addition, in accordance with the functioning of the flexible keel, the volume of the lift air flow necessary is of a minimum value for a given stability, because the internal air channel is not connected to the semichamber on the side which has its skirt separated from the surface, i.e., has its air outlet opened. When the vehicle heels the pressure in the longitudinal chamber on the side of the vehicle which approaches the surface increases. The increase in pressure occurs because the air outlet for that longitudinal section is closed. The closing of the air outlet also causes the flowrate in the longitudinal section to be practically reduced to zero. Hence, by having minimum pressure and flowrate values, the lift power required is also mimimum.

The lift system with which the vehicle is equipped is designed mainly to use lift fans with a characteristic pressure/flow curve having a considerable gradient (large dp/dq). The use of fans having a large dp/dq makes it possible to have the pressure in the rated working point of the fan practically equal to the air cushion or semichamber pressure. Another possible embodiment is to install fans with a characteristic pressure/flow curve having a smaller gradient or dp/dq, thereby creating a drop in pressure between the fan outlet and the semichamber, which is achieved by means of constricting the air passage. In any event, it should be stressed that fans having a large dp/dq usually provide better efficiency than fans having a smaller dp/dq.

The control of the roll and heave stability according to the present invention provides the following advantages. A simple valve suffices to regulate the flow of air to regulate the vertical stability easily and instantaneously. Through this regulation, the vertical accelerations of the vehicle can be controlled, which is translated into a greater platform stability without loss of roll stability. With this system, maximum regulation capacity is also obtained due to the virtual absence of any geometrical configuration contributing to the stability component.

The vehicle of the present invention has the further advantage of being able to control the vehicle roll simply, thereby improving its maneuvering and safety qualities.

A single valve is sufficient to control both vertical and transversal accelerations due to the manner in which the flexible keel functions. Indeed, if the pressure is the same in both air cushion longitudinal sections or semichambers the keel distributes the air equally to both semichambers. Closing the air flow valve from the fan to the keel has the effect of reducing the pressure in both semichambers, which is equivalent to a reduction in the lift force to a compensation of a purely vertical acceleration. If on the other hand, the acceleration produced is transversal or in roll, this means that there is a higher pressure in one of the air cushion semichambers, and hence the keel directs the air to that semichamber. A reduction in the air pressure therefore only effects that same semichamber.

The varied forms and embodiments which can be achieved by applying the basic principles of the present invention will be described in detail with the aid of the attached sheets of drawings, which are given by way of example.

BRIEF DESCRIPTION OF THE DRAWINGS

FIGS. 3A–3E are a bottom view, a front view, a side elevation view, an assembly view, illustrating an embodiment of the flexible keel.

FIGS. 4A–4E are a bottom view, a front view, a side elevation view, an assembly view and a plan view, respectively, all illustrating another embodiment of the flexible keel.

FIG. 15 is a diagrammatical illustration of a manual valve control according to the present invention.

DESCRIPTION OF THE PREFERRED EMBODIMENTS

Figure 1:
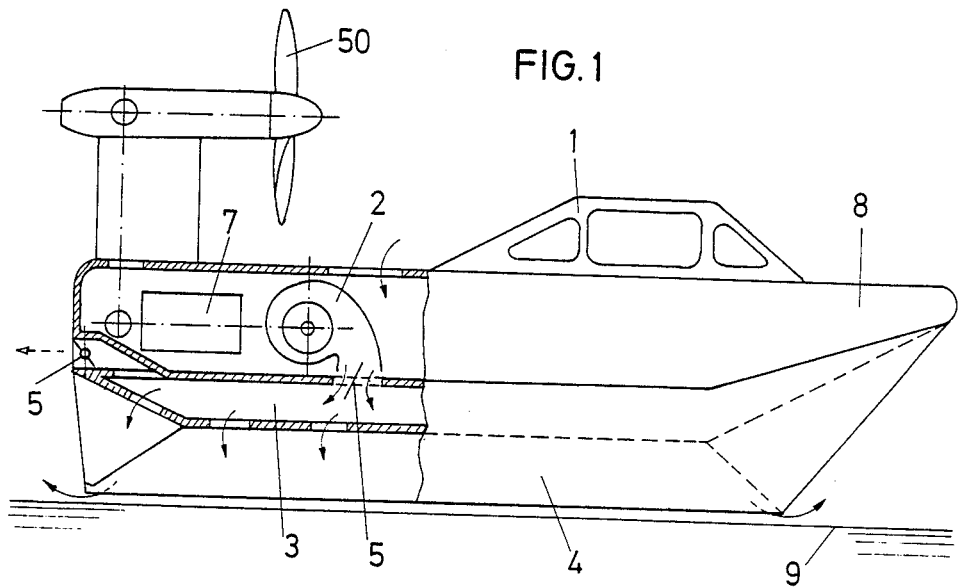
FIG. 1 is a diagrammatical illustration of an air cushion vehicle showing most of the elements of the air cushion vehicle.

Referring to FIG. 1, an amphibious air cushion vehicle comprises the following elements: A lift system, made up of one or several lift blowers 2, inner ducts or channels for distributing the air 3, flexible air distribution and retaining skirts 4, and control elements or means 5; a propulsion system 50, and a drive or motorization unit 7, common or independent for lift and propulsion; and a hull or rigid structure 8. A non-amphibious air cushion vehicle differs in that not all of the air retention walls 4 are flexible. The flexible skirt 6 can be made up of a single monoblock part or on the other hand can comprise independent and contiguous elements or segments, which in either case, form a wall impermeable to the air.

Figure 2:
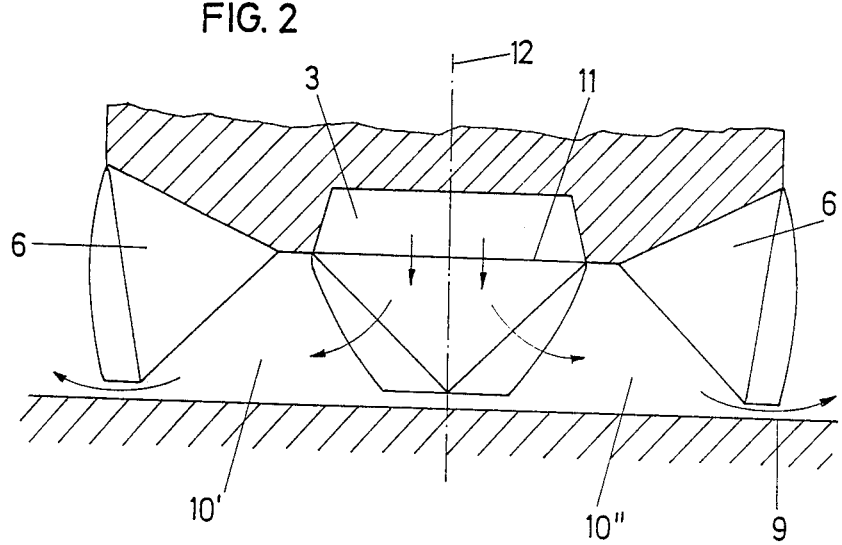
FIG. 2 is a cross-sectional view illustrating the hull, including the flexible keel in one of its preferred forms and the side skirts which transversally limit the supporting enclosure, in which the arrows indicate the flow of lift air.

Referring to FIG. 2, it can be seen that between the surface 9 on which the vehicle skims, the hull 8 and side skirts 6 an air cushion 10 is formed. The air cushion 10 is divided into two equal semichambers 10' and 10" by the flexible keel 11 which is placed in the sheer plane 12 of the vehicle, i.e. its longitudinal plane of symmetry. This flexible keel 11 stretches practically throughout the whole length of the air cushion 10, as its main aim is to divide the air cushion into two semichambers 10' and 10", between which it must be possible to establish a difference in pressure. Flexible elements of another type, not illustrated, will normally be arranged at the ends of the keel in order to provide transversal isolation between the two supporting semichambers 10' and 10". These other flexible elements are adapted to the shape of the hull, and in some cases may also provide longitudinal stabilization functions for the vehicle. In this Figure, the arrows indicate the flow of air and its direction.

Referring to FIGS. 3A–E and 4A–E, the flexible keel 11 is made up of two rows of elements of flexible segments 13, placed opposite each other, the segments of each row being intercalated and arranged symmetrically with respect to the diammetrical plane 12. Each of these segments 13 is formed by a sheet 14, made of flexible material which, when bent into the working position, forms a symmetrical layout with respect to the line 15. The symmetrical layout of each segment 13 comprises two triangular portions 14' and 14" which are joined by a trapezoidal portion 14''' with a curved bottom base. When this sheet 14 bends in the working position due to the effect of the pressure in the semichambers 10' and 10", the theoretical edges of the wall 14''' form a rectangle which is placed side by side with the wall 14''' corresponding to the adjacent segments 13 in the same row, i.e., facing in the same direction. The wall 14''' stretches from the bottom of the hull 8 of the vehicle downwards towards the surface 9 over which the vehicle glides, slanting from its upper attachment to the hull towards the sheer plane 12 as it extends towards the surface 9. The lower edge 16 of the wall 14''' can be near the sheer plane 12 and on the same side as the upper edge 17 as shown in FIG. 3B. Alternatively, the lower edge 16 can be placed on the opposite side of the sheer plane 12 from the upper edge 17 and further away from the sheer plane as shown in FIGS. 4B and 14A–C. With the configuration shown in FIG. 4B and 14A–C a third central longitudinal chamber 10''' is created. The third longitudinal chamber 10''' is under a lower pressure than the lateral semichambers 10' and 10''', providing advantages from the point of view of wave making drag. This alternative embodiment of the flexible segments 13 of the keel is illustrated in FIGS. 4A–4E. As can be seen in FIGS. 3A–E and 4A–E, the upper ends of the transversal triangles 14' and 14" are joined at a fastening point 19 by which they are fastened to the hull, so that the top edge of each element 13 forms a triangle.

When viewing FIGS. 3C and 4C, it must be taken into account that in practice the straight lines of the triangles are slightly curved due to the elasticity of the component material, so that the continuity of the tensions created is maintained by distributing pressures outside and inside each segment 13; this slight bend has been shown in the FIGS. 3C and 4C by means of dotted lines.

Figure 5:
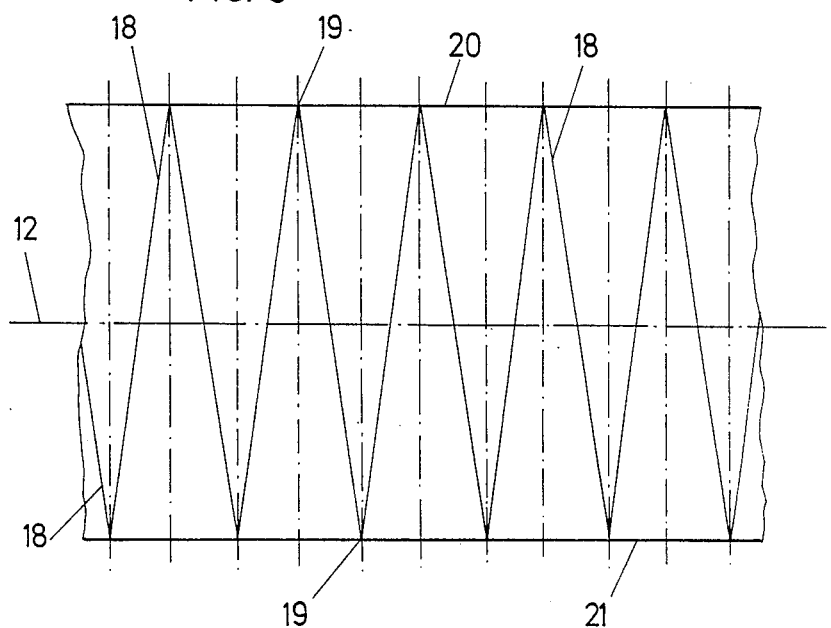
FIGS. 5 and 6 are a top view taken from under the hull, and a bottom view of the layout adopted by the elements or segments of the flexible keel in normal working conditions, i.e., with the vehicle in a perfectly upright position, respectively.
Figure 6:
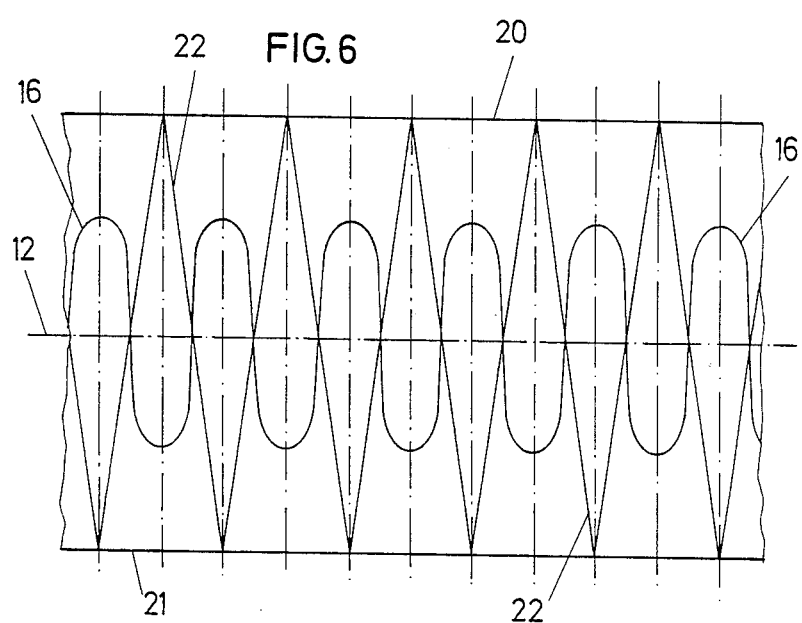

The two rows of flexible segments 13, as already mentioned, are arranged to symmetrically alternate with respect to the sheer plane 12. Thus, the triangles formed by the top edges 18 of one side are inserted between those formed by the segments of the opposite side, forming a continuous assembly of straight side edges; this arrangement can be seen in FIG. 5, in which the planes 20 and 21 are parallel to the sheer plane 12. The fastening points 19 by which the top ends 18 of the transversal triangles 14' and 14" are fastened to the hull are all situated along planes 20 and 21. The layout adopted by the bottom ends 16 of the segments or elements throughout the whole of the keel in normal conditions, i.e., with even pressure throughout the air cushion is illustrated in FIG. 6.

Figure 7:
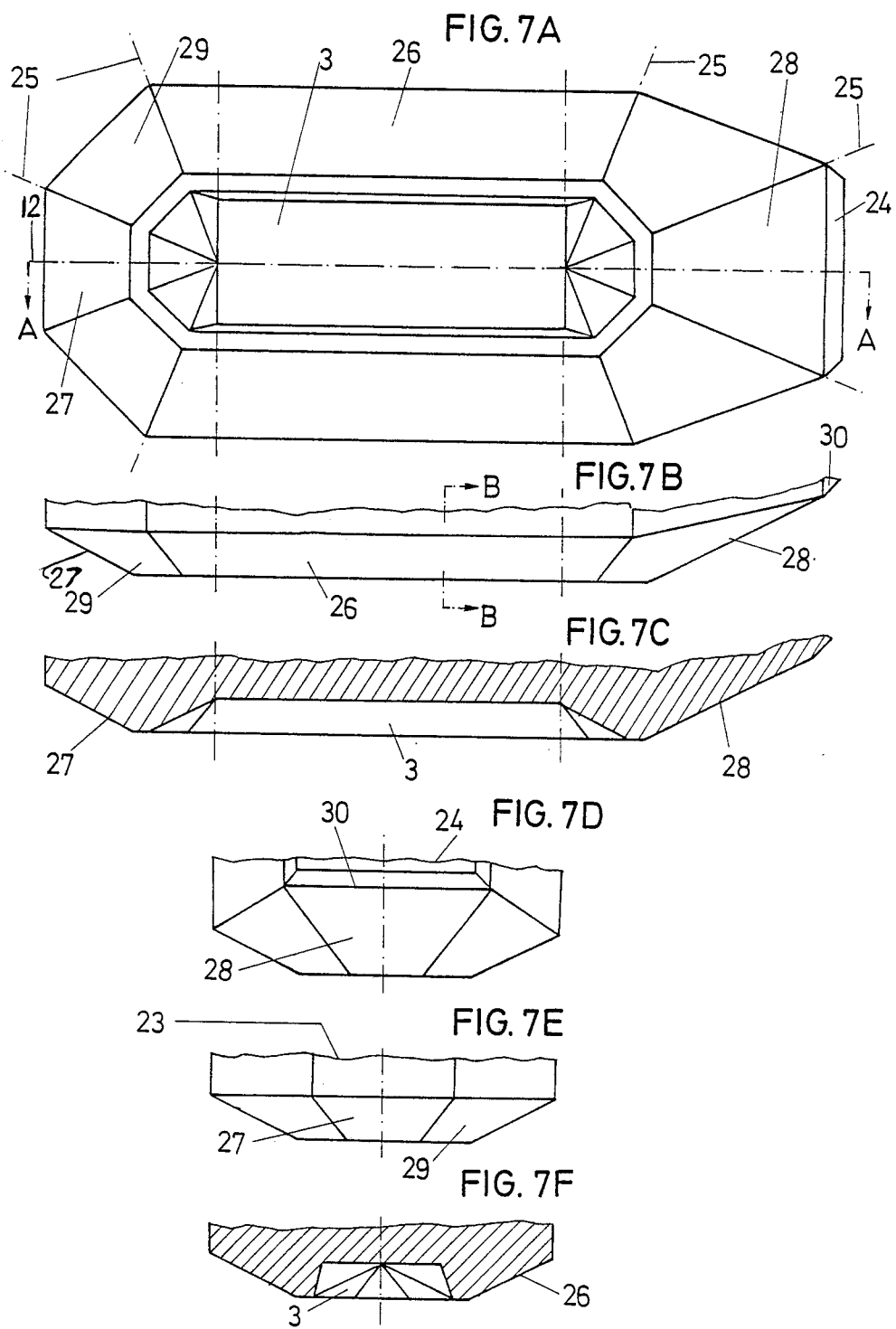
FIGS. 7A–7F are a plan view, a fragmentary elevation view, a longitudinal sectional view taken along the line A—A in FIG. 7A, a front elevation view, a rear elevation view, and a cross-sectional view taken along the line B—B in FIG. 7B, respectively, all illustrating an embodiment of the hull of an air cushion vehicle according to the present invention.
Figure 8:
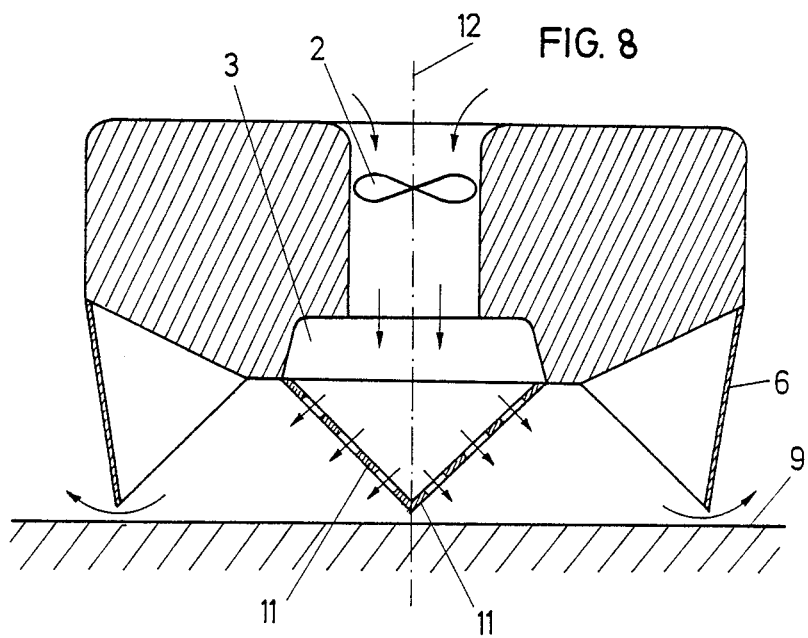
FIGS. 8 and 9 are cross-sectional diagrams illustrating respectively, the function of the flexible keel in the event or situation in which the vehicle is parallel to the surface or heeling with respect to the surface.

Referring now to FIG. 7, the portion of the underside of the hull enclosed by the upper fixing line at which the skirt is attached to the hull is substantially rectangular with the stern 23 having the shape of half of a regular octagon, the diameter of the octagon coinciding with the beam or width ov the aforementioned rectangular formation, and with the bow 24 having the shape of an elongated octagon. The air distribution channel 3 of the flexible keel has outlines parallel to those of the hull, except at the bow, where it is limited by lines symmetrical to those of the stern. The cross section of FIG. 7F shows the hard chine configuration 26 and the air distribution channel 3. The fragmentary elevation view of the hull in FIG. 7B shows the slanting flat sternpost 27 and a bow post with the same slant as that sternpost but longer, i.e., extended further upwards. In the longitudinal sectional view of FIG. 7C, the air distribution channel 3 and the bow and stern extensions are shown. The most characteristic feature of this hull are the sides of its bow, in which a flat configuration has been achieved. This flat configuration coincides with the form of quarters 29 in the stern. This arrangement provides the vehicle with good sea-going qualities when sailing over waves and great construction simplicity, not only for the rigid structure 8, but it also enables common elements to be used in the bow and stern skirts.

The air distribution channel 3 is provided with openings, not illustrated, which allow the air to pass from the lift fan 2 to the elements of the skirts 6 not belonging to the flexible keel 11 which require it.

Apart from the flexible skirt 6, which does not contribute noticeably to the vehicle's transversal stability, and the flexible elements which constitute the elements or segments 13 of the keel, the vehicle has some skirt elements at the bow and stern, not shown, which provide transversal stability either through their inclination, those in the bow slanting towards the stern from the top edge, and those in the stern, the opposite, or practically vertical, or by forming two air chambers, not illustrated, one at the bow and the other astern, whose pressure varies differentially as the vehicle pitches longitudinally, or by a combination of both methods.

To understand the working of the vehicle's supporting system better, reference is made to FIGS. 2, 6, 8, 9, 10, ,14A–C and 15.

Figure 9:
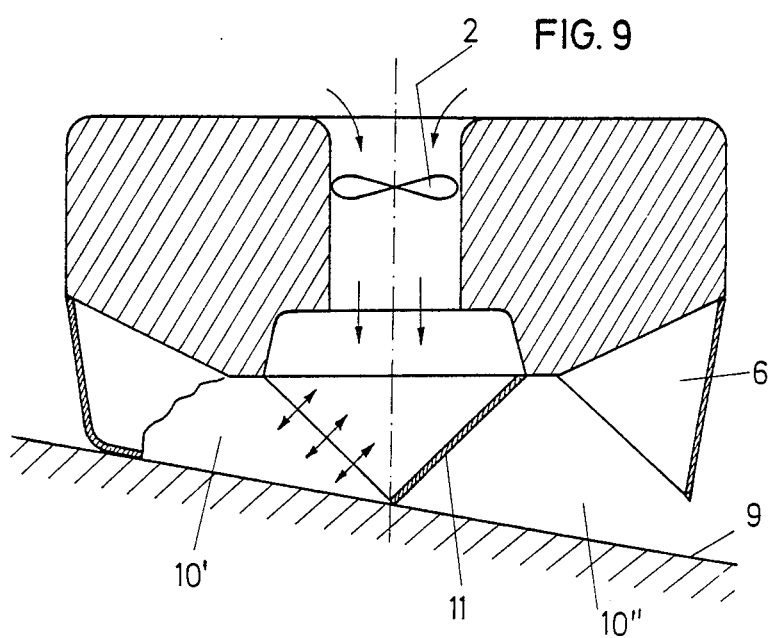
Figure 10:
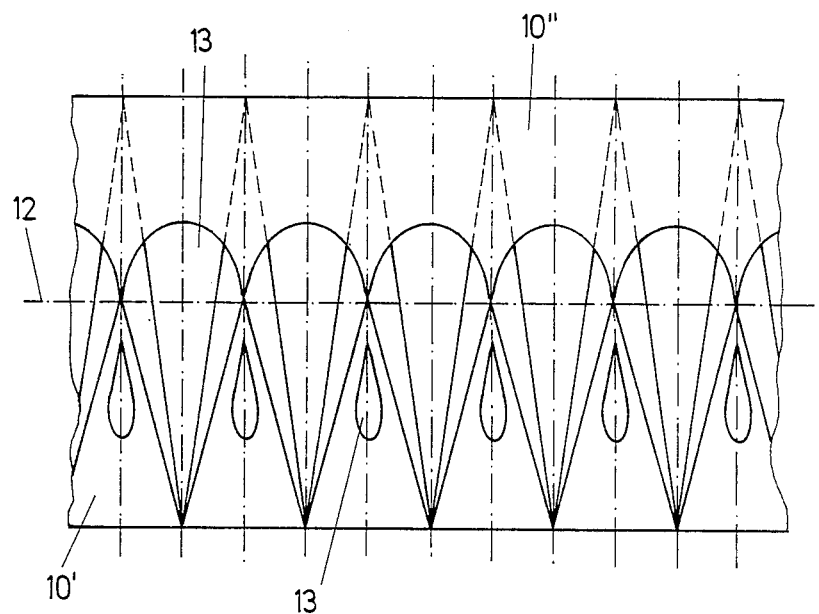
FIG. 10 is a bottom view of the flexible keel illustrating the working position of the elements or segments when the vehicle is heeling.

In FIGS. 2 and 9, it can be seen that the air distribution takes place through a longitudinal channel 3, located above the entire length of the flexible keel 11. In the cross sections of FIGS. 2 and 8, it can be seen how the flexible keel 11 divides the air cushion longitudinally into two semichambers 10' and 10". When the vehicle is parallel to the surface 9, the air outlet areas of both semichambers 10' and 10" which are created between the skirts or side walls 6 and the surface 9 are substantially equal in size, and therefore the pressure in both semichambers 10' and 10" is substantially equal. The segments 13 of the flexible keel 11 then adopt a similar arrangement to that shown in FIG. 6, the air passage areas to semichambers 10' and 10" from the distribution channel 3 being virtually the same. These air passage areas are defined by the triangles 14' and 14" which form the transversal walls of the keel 11, and the bottom edge 16 of the longitudinal wall 14'" (see FIGS. 3 and 4) of each segment 13. The air passages of the flexible keel are much larger than the air outlet sections under the side flaps 6 through which the same flow-rate must pass. Consequently, the loss of pressure when the air passes from the distribution channel to the air cushion is negligible. The embodiment having a third longitudinal semichamber 10''', illustrated in FIGS. 14A–14C, functions to control air flow in the same manner as the embodiment having two longitudinal semichambers 10' and 10".

Referring now to the situation illustrated in FIG. 9, i.e., when the vehicle heels transversally with respect to the surface 9, the skirts 6 of the side which falls rest on the surface, thereby closing the air outlet on that side. From the moment at which the air outlet is closed a cumulative process is produced beginning with the difference in pressure created between the two supporting semichambers, the pressure in semichamber 10' being greater than normal and the pressure in semichamber 10" being less than normal and tending towards zero.

When the air outlet of semichamber 10' is closed, the segments 13 of the flexible keel 11 having an longitudinal wall 14'" in semichamber 10" and an air outlet into semichamber 10' swell due to the increased pressure in semichamber 10' and close the air outlets of the segments 13 having the longitudinal wall 14'" in semichamber 10' and an air outlet into semichamber 10". The flowrate decreases on closing the air outlet of semichamber 10', which means that the pressure in the distribution channel 3 increases, either through the pressure/flowrate curve of the fan 2, or through the constriction between the outlet of fan 2 and the distribution channel 3. Consequently, at the end of this process, which is practically instantaneous, the segments 13 of the keel adopt the configuration illustrated in FIG. 10, the supporting semichamber 10' corresponding to the fallen side being at much greater pressure than that of the raised side, i.e., 10", as the air passage towards the latter has been closed.

In the situation in which the vehicle is heeling, the segments 13 facing the fallen side, semichamber 10' flatten the segments facing the opposite side, as there is no appreciable difference in pressure between the distribution channel 3 and the semichamber 10' of the fallen side. Referring again to FIG. 10, the air passage section has become completely closed towards the raised side, semichamber 10", and open to semichamber 10' further than in the normal position. As a result, a righting or stabilizing moment is created, the value of which depends on the pressure at the outlet of fan 2 at the instant when the flowrate has dropped through the effect of the heeling of the vehicle.

Figure 11:
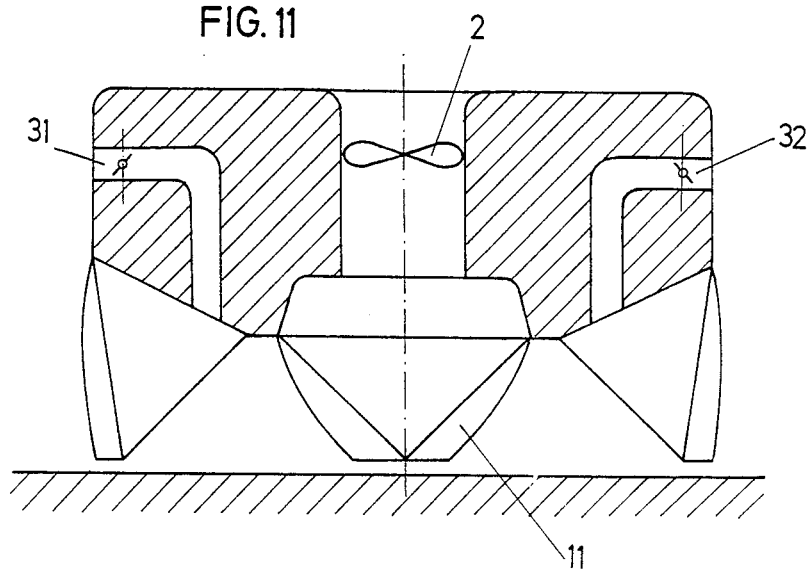
FIGS. 11, 12 and 13 are cross-sectional views illustrating three preferred embodiments of the heave and roll control system of a vehicle of the present invention.

Referring now to FIG. 11 illustrating a preferred embodiment of the lift system of the air cushion vehicle of the present invention allowing the air cushion vehicle to be manually controlled in roll and heave. The term "manual" should be understood, within the scope of this invention, as a definition of a system which allows manual operation and the possibility of its action being motorized or automatically governed by means of servodrives which respond to desired input signals. A system for manual control is illustrated in FIG. 15 and includes a manual input for inputting signals to a "manual" control means. It is the manual control means which can be constructed to operate "manually" or to automatically respond to signals from the manual input. The illustrated embodiment therefore concerns a control suited to low frequency changes and slow or sporadic operation.

Lateral or roll control produces the effect of tilting the vehicle transversally towards the desired side. This is achieved through two valves 31 and 32 which enable air to escape from each air cushion semichamber 10' or 10" to the atmosphere. Both valves 31 and 32 are normally closed. When one of them is opened, the vehicle tilts towards the side on which the air is allowed to escape. As soon as the pressure in one semichamber drops, the flexible keel 11 closes the supporting air passage towards that side, thereby creating a moment through the difference in pressure which tends to tilt the vehicle towards that side.

Heave control is achieved by opening both valves at the same time, since on decreasing the pressure in both supporting semichambers same time, the vehicle falls vertically.

This manual heave control can be useful to counteract foreseeable sporadic accelerations by the pilot (for example, those produced through the effect of a wave) or to make an emergency stop in a minimum stretch. Further, by placing the control valves so that they unload the air towards the stern, as illustrated in FIG. 1, an additional forward driving force is achieved.

Figure 12:
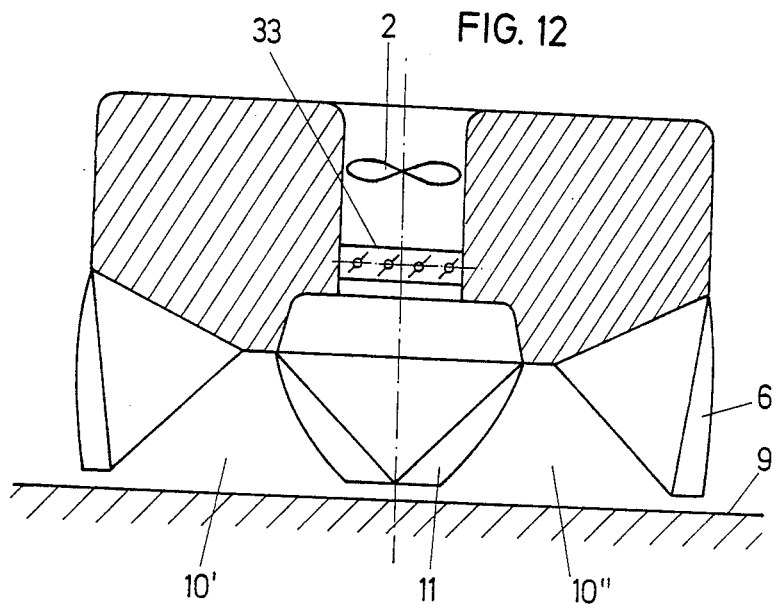

To further illustrate this invention, another embodiment of a lift system for the automatic heave and roll control of the vehicle 7 is described as illustrated in FIG. 12. This control includes a valve 33 which closes the air passage between the fan 2 and the flexible keel 11, i.e., it regulates the flow in the air passage from the fan to the air cushion. It differs from the manual control of the previously discussed embodiment in that its aim is to reduce accelerations of higher frequencies or which are produced more rapidly, and in which voluntary roll control is not possible. The main advantage of this embodiment is that it only requires one valve 33 to control by itself, i.e., automatically, both heave and roll accelerations.

Indeed, in this case, it is the flexible keel 11 which "decides" whether control is performed in heave or in roll, without the possibility of the pilot's voluntary intervention in this decision. If the acceleration which is taking place is vertical when the control valve 33 acts there is a drop in the lift force applied in the sheer plane. If, on the other hand, the acceleration has a roll component the keel 11 makes the drop in the lift force take place asymmetrically, thus creating a rolling moment which opposes the acceleration. The flexible keel 11, therefore, causes the effect of the action of the control valve 32 to opposite the heave or roll accelerations which act on the vehicle.

The working of this control system is based on the decrease in the lift force which is produced on closing the air passage to the air cushion. If the pressure is the same in both supporting semichambers 10, the force applied to the vehicle is purely vertical and hence any acceleration which the vehicle is suffering through its lift system, is also vertical. But in this case, the flexible keel 11 distributes the air equally to both air cushion semichambers 10, and consequently a drop in the flowrate of that air produced by closing the control valve 33 is translated into a pressure drop in both semichambers. The result is a purely vertical decrease in the lift force.

On the other hand, if the pressure is greater in one of the semichambers 10, the vehicle is subjected to acceleration with a roll component and the keel 11 directs the air to the semichamber with the highest pressure. Consequently, the drop in the lift force is applied asymmetrically, creating a rolling moment which opposes the initial acceleration.

Figure 13:
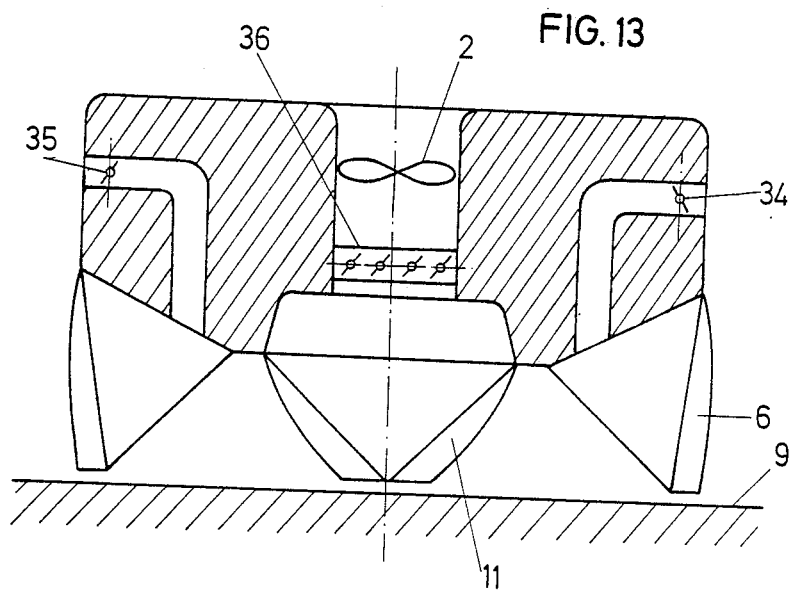
Figure 14A:
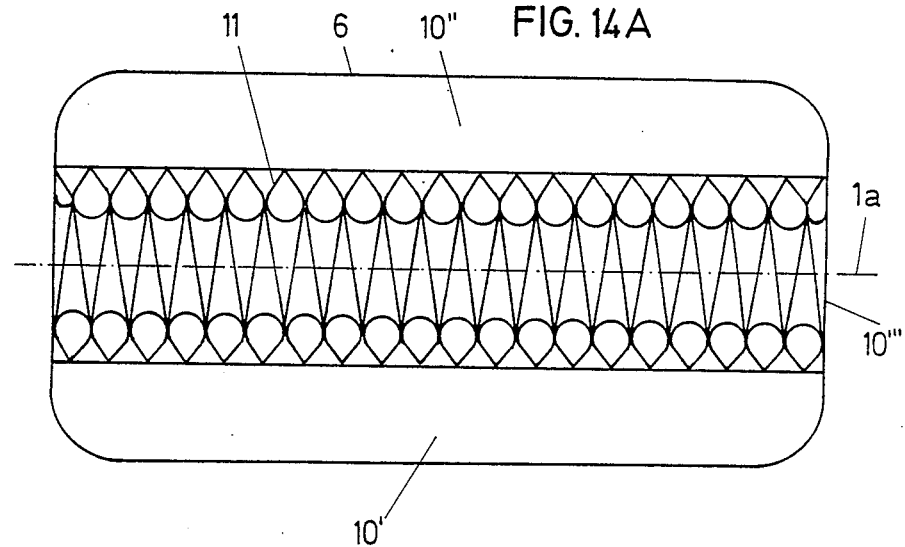
FIGS. 14A–14C are bottom views of the embodiment of the flexible keel having a third longitudinal semichamber.
Figure 14B:
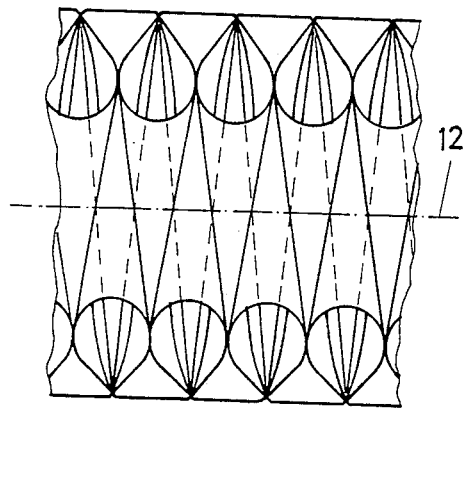
Figure 14C:
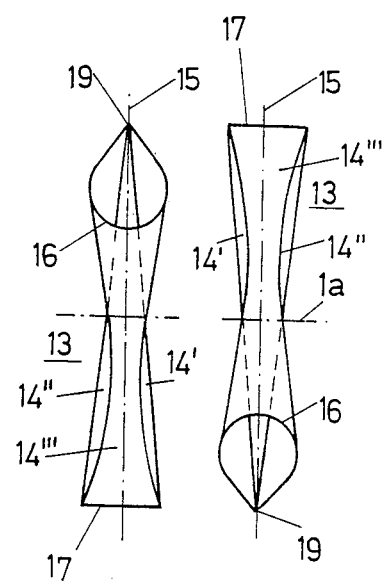

Finally, FIG. 13 illustrates another preferred form of embodiment of the supporting system of the vehicle is illustrated diagramatically and symbolically. This embodiment makes it is possible to provide automatic heave and roll control in addition to the manual control valves. This is a more effective embodiment, although more complicated. According to this embodiment one or both of the valves 34 and 35 are opened at the same time at which the valve 36 closes the air passage to the supporting chamber. Both valves 34 and 35 are opened if the acceleration is purely vertical. This embodiment is also provided with a sensor element which discriminates which side is accelerating.

After disclosing the object of the present invention by way of examples of some of the embodiments, taking as the basic element the construction described in these specification, it should be pointed out that modifications in shape, size, materials used and other non-essential modifications, should not be considered variations which affect the essential nature of the invention.

I claim:

1. An air cushion vehicle provided with a lift system with automatic transversal air distribution, comprising:
   a rigid body structure having internal channels for air distribution;
   a lift system including one or more lift fans;
   flexible skirts provided on said rigid body structure for distributing and retaining air in an air cushion chamber defined by said flexible skirts;
   a propulsion system;
   drive means for driving said lift fans and said propulsion system; and
   flexible keel means, provided on the bottom of said rigid body structure, for dividing said air cushion chamber into at least two longitudinal supporting semichambers, directing the air in the internal channels towards said semichambers, varying the air flow to said semichambers according to a difference in pressure between the said semichambers so as to automatically direct the lift air to one of said semichambers, thereby creating a righting or stabilizing moment the value of which depends on the output pressure of the fans with minimum loss of pressure so that the lift air flowrate required is minimum for a given stability.

2. An air cushion vehicle provided with a lift system with automatic transversal air distribution according to claim 1 wherein the flexible keel means comprises two rows of elements or flexible segments the segments of each row being inserted between each other and symmetrically arranged with respect to the longitudinal symmetry plane of the rigid body structure, each of said segments being made of a laminar element formed of a flexible material which when developed forms an arrangement comprising two triangular portions joined by a trapezoidal portion with a curved bottom base.

3. An air cushion vehicle provided with a lift system with automatic transversal air distribution, according to claim 2 wherein each trapezoidal portion has a bottom edge and a top edge said bottom and top edges being placed on opposite sides of the longitudinal symmetry plane, the bottom edge being at a considerable distance from the said sheer plane so as to form a third central longitudinal chamber.

4. An air cushion vehicle provided with a lift system with automatic transversal air distribution, according to claim 2, further comprising two valves each communicate the two semichambers (10' and 10") with the outside to allow the air to escape from each of the said supporting semichambers to the atmosphere said valves being manually operated.

5. An air cushion vehicle provided with a lift system with automatic transversal air distribution, according to claim 2, further comprising an automatic valve provided in said internal channels between the lift fans and the flexible keel so as to regulate the passage of air from the lift fans to the air cushion.

6. An air cushion vehicle provided with a lift system with automatic transversal air distribution, according to claim 2, further comprising two valves which communicate each of the two semichambers with the atmosphere, to allow the air to escape from each of them outside, and a valve which can close the whole passage of air from the lift fans to the flexible keel so that it is possible to control roll and heave accelerations both manually and automatically.

7. An air cushion vehicle provided with a lift system with automatic transversal air distribution, according to claim 6, wherein some skirt elements will be arranged at the bow and stern of the rigid body structure, said skirt elements having a certain slant, or producing two air chambers, one at the bow and the other astern, whose pressure varies differentially when the vehicle pitches longitudinally, or a combination of these arrangements so as to provide longitudinal stability.

8. An air cushion vehicle provided with a lift system with automatic transversal air distribution, according to claim 1, wherein the rigid body structure of the vehicle has a rectangular central arrangement finished at the stern by half of a regular octagon whose diameter coincides with the beam or width of said rectangular formation, and finished at the bow by an extended octagon, wherein the flexible keel means is formed below said air distribution channel and said air distribution channel has some contours which are parallel to those of the hull, except at the bow, where it is limited by contours symmetrical to those at the stern.

9. An air cushion vehicle, comprising:
a rigid body structure having a top, a bottom, a longitudinal axis and internal channels for air distribution;
means, provided on said rigid structure, for providing lift air to said internal channels;
flexible skirts provided at the periphery of said bottom of said rigid structure;
means, provided on said rigid structure, for propelling the vehicle; and
a flexible keel attached to the bottom of said rigid structure along the longitudinal axis of the rigid structure in communication with said internal channels, said flexible keel having a plurality of flexible segments, each flexible segment being attached to the bottom of said rigid structure in the form of a triangle.

10. An air cushion vehicle according to claim 9, wherein each said flexible segment is formed from a sheet of flexible material having two triangular portions joined by a trapezoidal portion with a curved base, wherein said two triangular portions are joined at an attaching point, and wherein said attaching point is one corner of said triangle.

11. An air cushion vehicle according to claim 10, wherein said flexible segments are substantially perpendicular to said longitudinal axis of said rigid structure and wherein said flexible segments are arranged so that alternate segments face in opposite directions.

12. An air cushion vehicle according to claim 9, wherein said rigid body structure has a length and said flexible keel extends over substantially the entire length of said rigid body structure.

* * * * *